(12) United States Patent
Garr

(10) Patent No.: US 8,575,520 B2
(45) Date of Patent: Nov. 5, 2013

(54) HEATING SYSTEMS FOR HEATING ITEMS IN HEATING COMPARTMENTS

(76) Inventor: Daniel Garr, Los Angeles, CA (US)

(*) Notice: Subject to any disclaimer, the term of this patent is extended or adjusted under 35 U.S.C. 154(b) by 939 days.

(21) Appl. No.: 12/049,054

(22) Filed: Mar. 14, 2008

(65) Prior Publication Data

US 2008/0223845 A1 Sep. 18, 2008

Related U.S. Application Data

(60) Provisional application No. 60/918,166, filed on Mar. 15, 2007, provisional application No. 60/930,314, filed on May 15, 2007.

(51) Int. Cl.
*F24C 7/10* (2006.01)

(52) U.S. Cl.
USPC ........... 219/386; 219/391; 219/392; 219/393; 219/394; 219/395; 219/396; 219/406; 219/407; 219/408; 219/409; 219/410; 219/411; 99/339; 99/340; 99/357; 99/448; 126/55; 126/273 R; 126/273.5; 126/274; 126/275 R; 126/275 E

(58) Field of Classification Search
USPC ........... 219/386, 391–396, 406–411; 99/339, 99/340, 357, 448; 126/55, 273 R, 273.5, 126/274, 275 R, 275 E
See application file for complete search history.

(56) References Cited

U.S. PATENT DOCUMENTS

| | | | | |
|---|---|---|---|---|
| 1,120,758 A | * | 12/1914 | Stirn | 219/218 |
| 1,158,475 A | * | 11/1915 | Fox | 219/218 |
| 1,319,878 A | * | 10/1919 | Lewis | 99/422 |
| 2,061,637 A | * | 11/1936 | Schulz | 219/452.11 |
| 2,156,214 A | * | 4/1939 | Woodman | 126/275 R |
| 2,570,521 A | * | 10/1951 | Chester | 99/323 |
| 2,693,750 A | * | 11/1954 | Badenoch | 99/329 R |
| D176,099 S | * | 11/1955 | Bonistall | D7/501 |
| 2,817,744 A | * | 12/1957 | Free | 219/439 |
| 2,897,330 A | * | 7/1959 | Hopkins | 219/218 |
| 2,897,746 A | * | 8/1959 | Hilgers | 99/443 R |
| 3,019,783 A | * | 2/1962 | Clarke | 126/375.1 |
| 3,239,651 A | * | 3/1966 | Silberman | 219/388 |
| 3,385,357 A | * | 5/1968 | Burg | 165/185 |
| D217,733 S | * | 6/1970 | Singer et al. | D7/355 |
| 3,636,299 A | * | 1/1972 | Stewart, Jr. | 219/201 |
| 3,727,306 A | | 4/1973 | Patik | |
| 3,734,077 A | * | 5/1973 | Murdough et al. | 126/246 |
| 3,785,274 A | * | 1/1974 | Yamamoto | 99/425 |
| 3,837,330 A | * | 9/1974 | Lanigan et al. | 126/246 |

(Continued)

FOREIGN PATENT DOCUMENTS

| | | |
|---|---|---|
| JP | 2003-265297 | 9/2003 |
| JP | 2007-301312 | 11/2007 |
| WO | WO 2006/004290 A1 | 1/2006 |

*Primary Examiner* — Henry Yuen
*Assistant Examiner* — Eric Stapleton
(74) *Attorney, Agent, or Firm* — Foley & Lardner LLP

(57) ABSTRACT

Various embodiments of the present invention are directed to heating systems. In various embodiments, a tray may be supported adjacent a housing having a plurality of heating compartments configured to provide heat to food items within each of the heating compartments. In other embodiments, a vessel may be configured to be disposed in a housing having a plurality of heating compartments configured to provide heat within each of the heating compartments. In further embodiments, a housing may have a plurality of heating compartments configured to provide heat within each of the heating compartments, and the heating compartment may have open ends arranged around a circumference of the housing.

30 Claims, 12 Drawing Sheets

(56) References Cited

U.S. PATENT DOCUMENTS

| | | | |
|---|---|---|---|
| 3,851,599 A * | 12/1974 | Bridges | 108/25 |
| 3,875,370 A * | 4/1975 | Williams | 219/386 |
| 3,972,419 A * | 8/1976 | Short | 211/78 |
| 4,034,200 A * | 7/1977 | Visagie | 219/218 |
| 4,215,267 A * | 7/1980 | Kaebitzsch | 219/439 |
| 4,216,763 A * | 8/1980 | Miklas | 126/275 R |
| 4,275,646 A * | 6/1981 | Barna | 99/323 |
| 4,305,329 A * | 12/1981 | Fenoglio | 99/339 |
| 4,374,319 A * | 2/1983 | Guibert | 219/400 |
| 4,430,559 A * | 2/1984 | Rabay | 219/449.1 |
| 4,521,964 A | 6/1985 | Maruyama | |
| 4,768,427 A * | 9/1988 | Cheng | 99/422 |
| D297,899 S * | 10/1988 | Kato | D7/686 |
| 4,785,968 A * | 11/1988 | Logan et al. | 220/573.3 |
| 4,853,509 A * | 8/1989 | Murakami | 219/731 |
| 4,904,009 A * | 2/1990 | Kozlinski | 294/7 |
| 4,982,722 A * | 1/1991 | Wyatt | 126/400 |
| 5,077,460 A * | 12/1991 | Rocha et al. | 219/217 |
| 5,189,282 A * | 2/1993 | Rocha et al. | 219/467.1 |
| 5,290,997 A * | 3/1994 | Lai et al. | 219/218 |
| 5,373,640 A | 12/1994 | Cordeiro, Jr. | |
| 5,421,271 A * | 6/1995 | Sui | 108/50.02 |
| 5,431,091 A * | 7/1995 | Couture | 99/401 |
| 5,634,719 A * | 6/1997 | La Neve | 374/141 |
| 5,665,258 A * | 9/1997 | Hsu | 219/388 |
| 5,699,722 A * | 12/1997 | Erickson et al. | 99/330 |
| 5,699,784 A * | 12/1997 | Tippmann et al. | 126/33 |
| 5,784,952 A * | 7/1998 | Liu | 99/483 |
| 5,796,082 A * | 8/1998 | Kim | 219/752 |
| 5,894,943 A * | 4/1999 | Liu | 211/78 |
| 6,112,742 A * | 9/2000 | Lin | 126/275 E |
| 6,170,386 B1 * | 1/2001 | Paul | 99/281 |
| 6,186,055 B1 * | 2/2001 | DeMars et al. | 99/340 |
| 6,229,131 B1 * | 5/2001 | Koochaki | 219/731 |
| 6,253,665 B1 * | 7/2001 | Backus et al. | 99/421 H |
| 6,265,695 B1 * | 7/2001 | Liebermann | 219/385 |
| 6,376,803 B1 * | 4/2002 | Klinger | 219/387 |
| 6,408,742 B1 * | 6/2002 | Backus et al. | 99/421 H |
| 6,457,238 B1 | 10/2002 | Maier et al. | |
| 6,487,964 B2 * | 12/2002 | Snoke et al. | 99/345 |
| 6,536,334 B2 * | 3/2003 | Backus et al. | 99/421 H |
| 6,557,368 B1 * | 5/2003 | DeMars | 62/457.2 |
| 6,681,684 B1 * | 1/2004 | Chen | 99/448 |
| 6,705,109 B2 * | 3/2004 | DeMars | 62/457.2 |
| 6,769,906 B1 * | 8/2004 | Grove et al. | 431/326 |
| 7,005,615 B2 * | 2/2006 | Thomas | 219/429 |
| 7,117,865 B2 * | 10/2006 | Siegel et al. | 126/26 |
| 7,144,596 B2 * | 12/2006 | Snoke et al. | 426/644 |
| 7,146,905 B2 * | 12/2006 | Scharbo et al. | 99/345 |
| 7,285,751 B2 * | 10/2007 | Li | 219/386 |
| 7,288,745 B2 * | 10/2007 | Colonna | 219/439 |
| 7,312,424 B2 * | 12/2007 | Hannon et al. | 219/432 |
| 7,690,294 B2 * | 4/2010 | Cantu | 99/401 |
| 7,690,585 B1 * | 4/2010 | Johns et al. | 239/16 |
| 2001/0035402 A1 * | 11/2001 | Barrow | 219/432 |
| 2004/0173104 A1 * | 9/2004 | Upton | 99/357 |
| 2004/0217109 A1 * | 11/2004 | Chang | 219/525 |
| 2005/0035109 A1 * | 2/2005 | Thomas | 219/429 |
| 2006/0049165 A1 * | 3/2006 | Li | 219/386 |
| 2007/0006465 A1 | 1/2007 | Lee | |
| 2007/0084853 A1 * | 4/2007 | Shingler | 219/452.11 |
| 2007/0205619 A1 | 9/2007 | Flather | |
| 2007/0284358 A1 * | 12/2007 | Claffy | 219/386 |
| 2008/0028945 A1 * | 2/2008 | Almond | 99/287 |
| 2008/0036226 A1 | 2/2008 | Yoon | |
| 2008/0223845 A1 * | 9/2008 | Garr | 219/386 |
| 2009/0134055 A1 * | 5/2009 | Spellman | 206/553 |

* cited by examiner

HEATING SYSTEMS FOR HEATING ITEMS IN HEATING COMPARTMENTS

CROSS-REFERENCE TO RELATED PATENT APPLICATIONS

This application claims priority from U.S. Provisional Application 60/918,166, filed Mar. 15, 2007, entitled "Fondue Raclette Cooking Unit," and U.S. Provisional Application 60/930,314, filed May 15, 2007, entitled "Fondue Raclette Cooking Unit with or without Fondue Accessory," both of which are incorporated herein by reference in their entirety.

BACKGROUND OF THE INVENTION

1. Field of the Invention

Embodiments of the present invention relate generally to heating systems and methods.

2. Related Art

Serving trays, for example for serving food items, have long been the object of much interest to people who serve groups of people. The serving trays tend to localize one or more types of food items being dispensed and several people may usually withdraw food simultaneously from the serving trays.

One configuration of this type of serving tray is a rotatable serving tray wherein several compartments are arranged around a central hub. This type of serving tray is either picked up and spun by hand so the selected food item is placed adjacent to the party desiring the food item, or the body of the serving tray is free to rotate about a central hub on a bearing or bearings such that the entire serving tray need not be lifted to spin the body or the serving tray.

SUMMARY OF THE INVENTION

Various embodiments of the present invention are directed to heating systems and methods. A heating system may include, but is not limited to, a tray and a housing. The tray may have one or more compartments for holding food items. The housing may be supported adjacent the tray. The housing may have a plurality of heating compartments configured to provide heat within each of the plurality of heating compartments.

In various embodiments, the tray may surround the housing. In some embodiments, the tray may be supported for rotation about the housing. In further embodiments, the plurality of heating compartments may be arranged around a circumference of the housing. In yet further embodiments, the tray may include a plurality of tray sections configured to be connectable to each other.

In various embodiments, the system may further include a bowl-shaped vessel configured to be disposed within the housing. In some embodiments, the bowl-shaped vessel may be configured to be disposed adjacent to each of the plurality of heating compartments when disposed within the housing.

In various embodiments, the system may further include a heating mechanism adjacent the bowl-shaped vessel. The first heating element may be configured to provide heat to the bowl-shaped vessel. In some embodiments, the housing may have a recess for receiving the bowl-shaped vessel. Each of the plurality of heating compartments may have a rear opening in communication with the recess of the housing.

In further embodiments, the bowl-shaped vessel may be configured to at least partially block the rear opening of each of the plurality of heating compartments when the bowl-shaped vessel is in the recess of the housing. In yet further embodiments, the bowl-shaped vessel may be configured to provide heat to each of the plurality of heating compartments through the rear opening of each of the plurality of heating compartments when the bowl-shaped vessel is in the recess of the housing and the bowl-shaped vessel is heated by the heating mechanism. In some embodiments, the heating mechanism may comprise a coil burner.

In various embodiments, the system may further include a plurality of heating elements. Each heating element may be arranged to provide heat to a respective one of the plurality of heating compartments. In some embodiments, the plurality of heating elements may comprise a plurality of radiant heaters.

In various embodiments, the system may further include a shaft, a bowl-shaped container, and a covering. The bowl-shaped container may be supported by the shaft. The covering may be operatively connected to the shaft. The covering may be configured to be moveable along the bowl-shaped container to open and close the bowl-shaped container.

In various embodiments, the system may further include a pair of elongated members. The pair of elongated members may be operatively connected at an end of each respective elongated member. Each of the pair of elongated members may have contoured ends opposite from the end connected to the other elongated member. The contoured ends may be configured to connect with each other to form a bowl-shaped vessel when the contoured ends of the pair of elongated members are brought together.

According to another embodiment of the present invention, a heating system may include, but is not limited to, a housing and a vessel. The housing may have a plurality of heating compartments configured to provide heat within each of the plurality of heating compartments. The vessel may be configured to be disposed within the housing. The vessel may be adjacent to an open side of each of the plurality of heating compartments. In some embodiments, the vessel may be bowl-shaped.

In various embodiments, the system may further include a housing, a base, and a heating mechanism. The base may support the housing. The heating mechanism may be supported on the base. The heating mechanism may be configured to provide heat to the vessel when the vessel is disposed within the housing. In some embodiments, the first heating element may comprise a coil burner.

In various embodiments, a gap may be provided between the first heating element and the housing. The heating mechanism may be configured to provide heat to each of the plurality of heating compartments through the gap when the vessel is disposed within the housing and the vessel is heated by the heating mechanism.

In various embodiments, the housing may have a recess for receiving the vessel. Each of the plurality of heating compartments may have a rear opening in communication with the recess of the housing. In some embodiments, the vessel may be configured to at least partially block the rear opening of each of the plurality of heating compartments in a case where the vessel is in the recess of the housing. In further embodiments, the vessel may be configured to provide heat to each of the plurality of heating compartments through the rear opening of each of the plurality of heating compartments when the vessel is in the recess of the housing and the vessel is heated by the heating mechanism.

According to another embodiment of the present invention, a heating system may include, but is not limited to, a housing. The housing may have a plurality of heating compartments configured to provide heat within each of the plurality of heating compartments. Each heating compartment may have an open end for receiving items to be heated. The open ends of the heating compartments may be arranged around a circumference of the housing.

In various embodiments, the system may further include a plurality of heating elements. Each heating element may be arranged to provide heat to a respective one of the plurality of heating compartments. In some embodiments, the plurality of second heating elements may comprise a plurality of radiant heaters.

DETAILED DESCRIPTION OF THE PREFERRED EMBODIMENTS

Embodiments of the present invention relate to systems and processes for heating, including but not limited to cooking, materials such as, but not limited to food items. Embodiments as illustrated herein may be used for heating, including cooking, food items for or by multiple users. Such systems and processes may be used for serving food items at parties, dinners, gatherings, and the like.

However, other embodiments may be used for heating other items or for other environments of use. Accordingly, while references may be made to food items, including heating or cooking food items, in the following description of the illustrated embodiments, other embodiments of the present invention are not limited to use with food items.

Figure 1A:
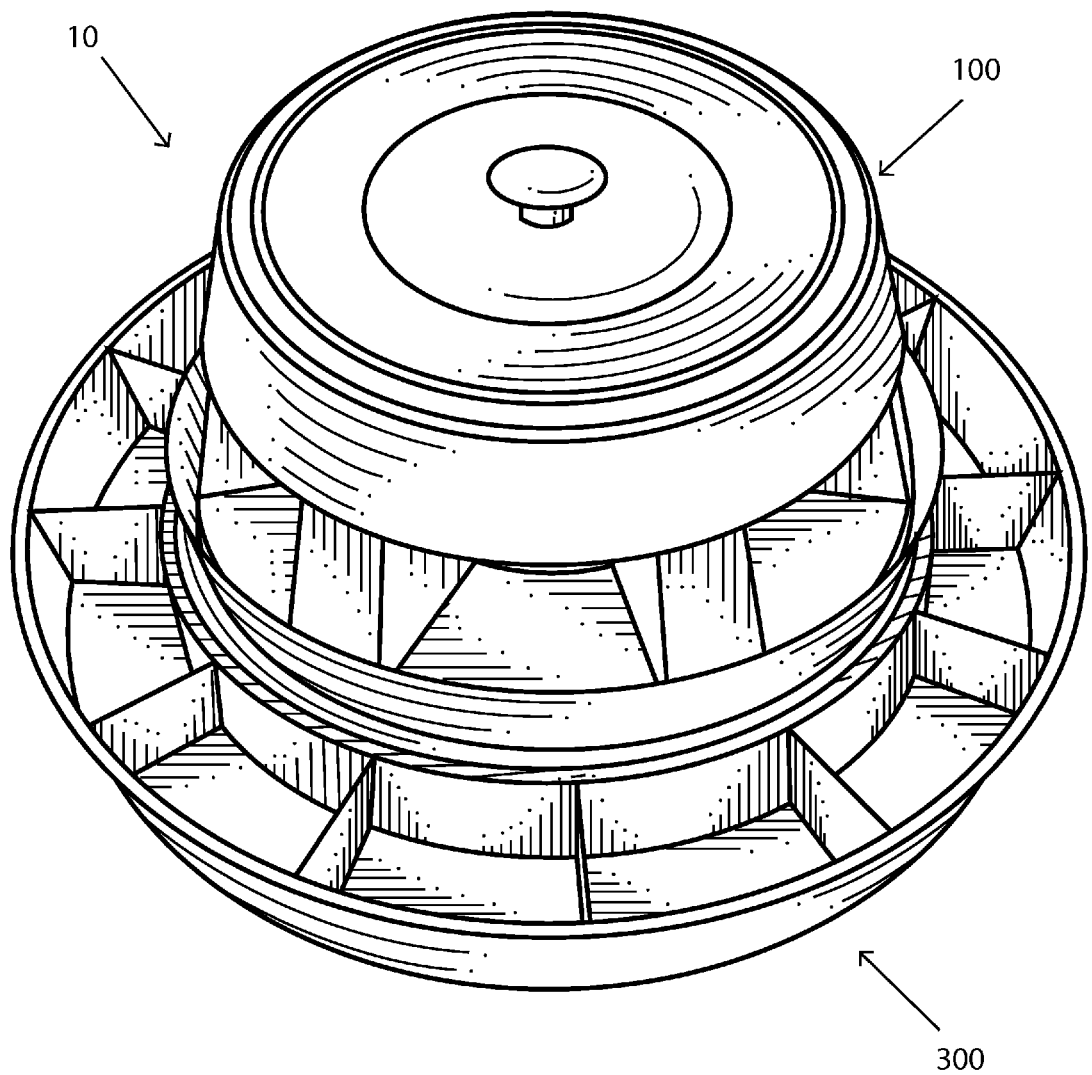
FIG. 1A illustrates a generalized representation of a heating system in accordance with an embodiment of the present invention.
Figure 1B:
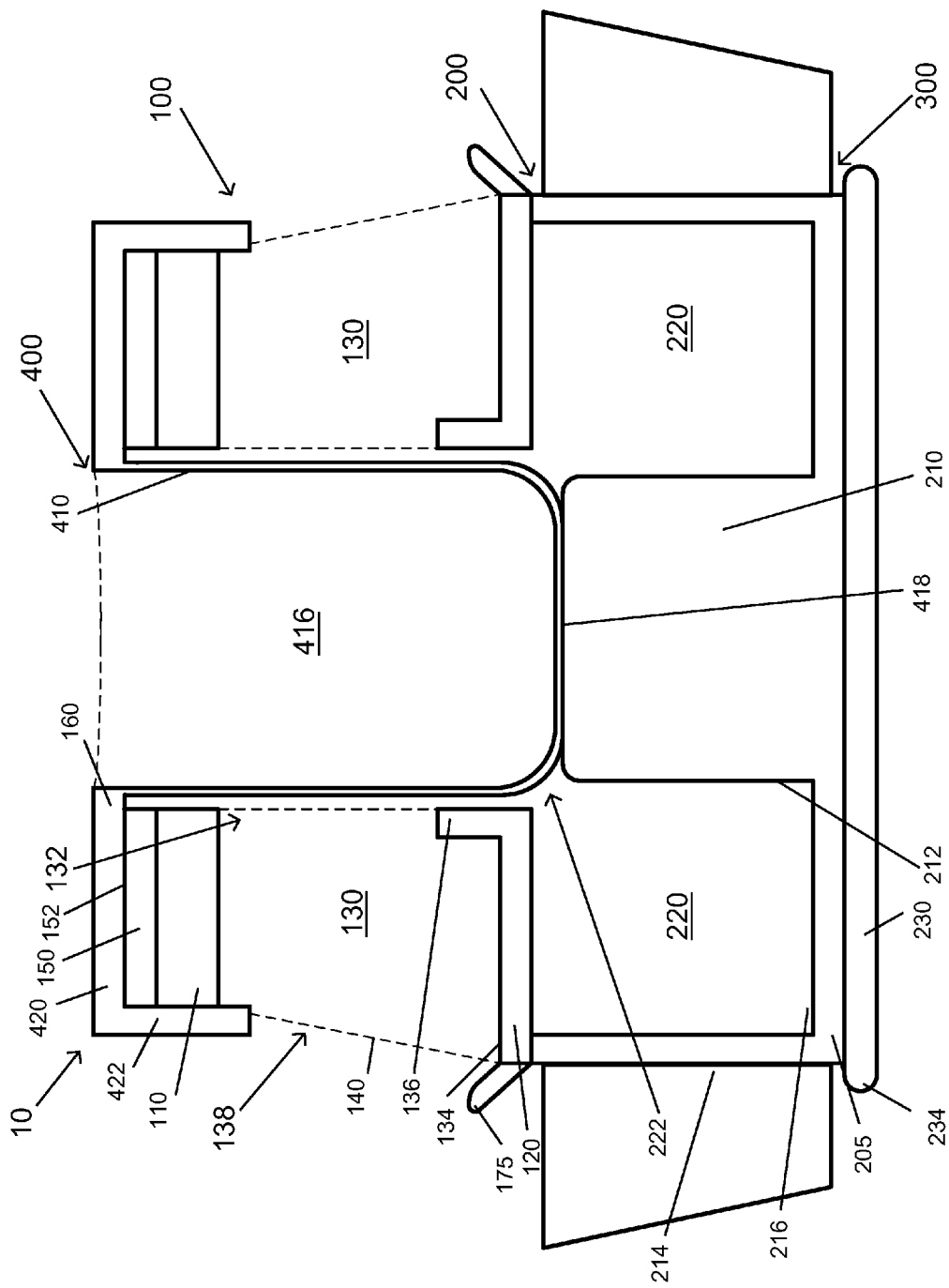
FIG. 1B illustrates a cross-section of a heating system in accordance with an embodiment of the present invention.

FIG. 1A illustrates a generalized representation of a heating system 10 in accordance with an embodiment of the present invention. FIG. 1B illustrates a cross-section of a heating system 10 in accordance with an embodiment of the present invention. With reference to FIGS. 1A and 1B, the heating system 10 may include, but is not limited to, an oven console 100, a heating console 200, and a tray 300. The heating system 10 may further include a vessel, such as a center pot 400.

In various embodiments, the oven console 100 may be located above the heating console 200. In various embodiments, the tray 300 may be positioned adjacent the heating console 200. In further embodiments, the center pot 400 may be located at least partially within the oven console 100. The positions of the oven console 100, the heating console 200, the tray 300, and/or the center pot 400 as illustrated in FIG. 1 are provided only as representative, non-limiting, examples.

Figure 2:
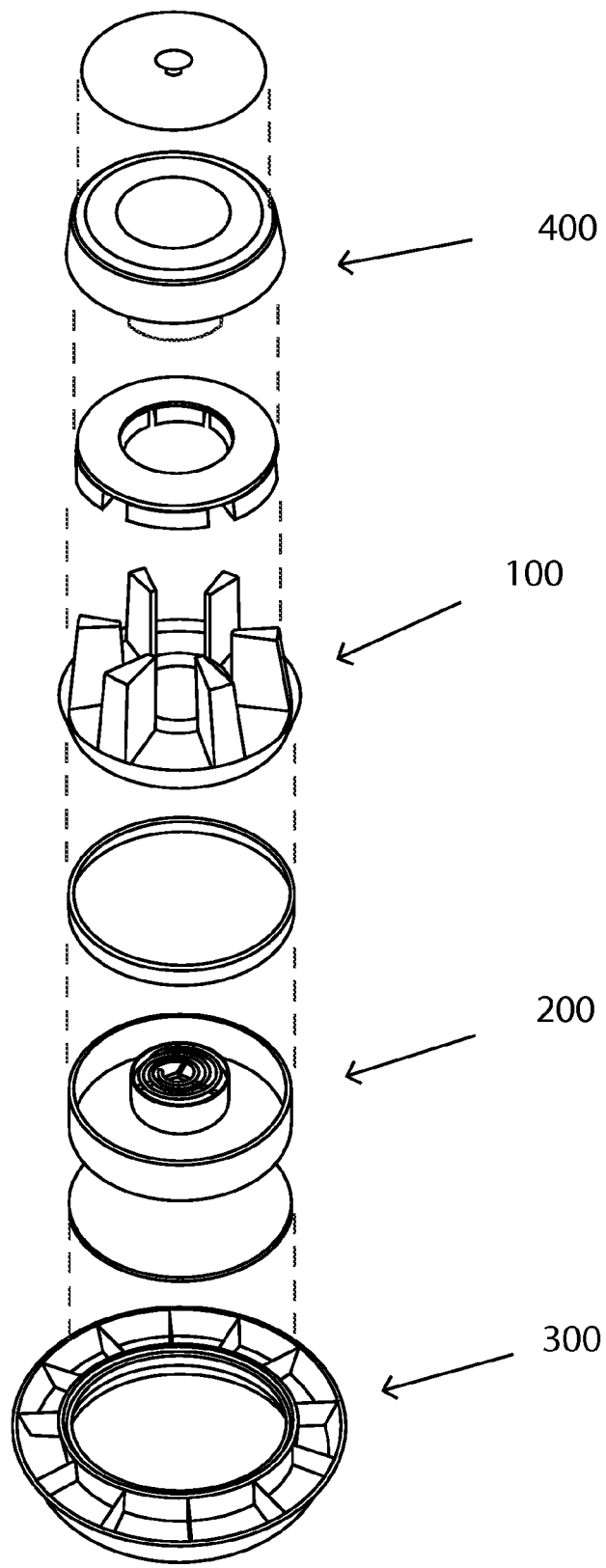
FIG. 2 illustrates an exploded view of a heating system in accordance with an embodiment of the present invention.

FIG. 2 illustrates an exploded view of the heating system 10 in accordance with an embodiment of the present invention. With reference to FIGS. 1A, 1B, and 2, the oven console 100 may be configured to provide individual heat sources for heating, including, but not limited to, cooking materials, such as, but not limited to, food items. In various embodiments, food items such as, but not limited to, raw fish, meat, noodles, pasta, vegetables, and the like, can be heated in the oven console 100 of the heating system 10. The oven console 100 may include a plurality of heating compartments 130 each with individual heating elements 110, such as, but not limited to, radiant heaters. Food items may be heated by placing the food items within one or more of the heating compartments 130.

The oven console 100 may include an upper ring 150 located at a top end of the oven console 100. The upper ring 150 may have a central aperture 155. The central aperture 155 may be aligned with a central recess 160 of the oven console 100. The central recess 160 and the oven console 100 may be configured for receiving the center pot 400 when the center pot 400 is inserted into the central aperture 155 of the upper ring 150 and into the central recess 160 of the oven console 100.

The heating console 200 may be configured to provide a heat source for heating, including, but not limited to, cooking, food items in the heating system 10. The heating console 200 may comprise a base 205 and an heating mechanism 210 for providing a heat source to the center pot 400 such that food items may be heated in the center pot 400.

In some embodiments, the heating mechanism 210 may be for providing a heat source to the center pot 400. In various embodiments, the heating mechanism 210 may be for providing an additional heat source to each of the heating compartments 130 of the oven console 100. In such embodiments, the additional heat source provided by the heating mechanism 210 may accelerate heating of food items in the heating compartments 130 of the oven console 100.

The tray 300 may be provided around the heating console 200. The tray 300 may have many different, separated tray compartments 310 for storing various food items, sauces, condiments, and the like. In some embodiments, the tray 300 may be rotatable about the heating console 200 to allow a user located on any side of the heating system 10 to easily select one or more food items in any one of the tray compartments 310.

Figure 3:
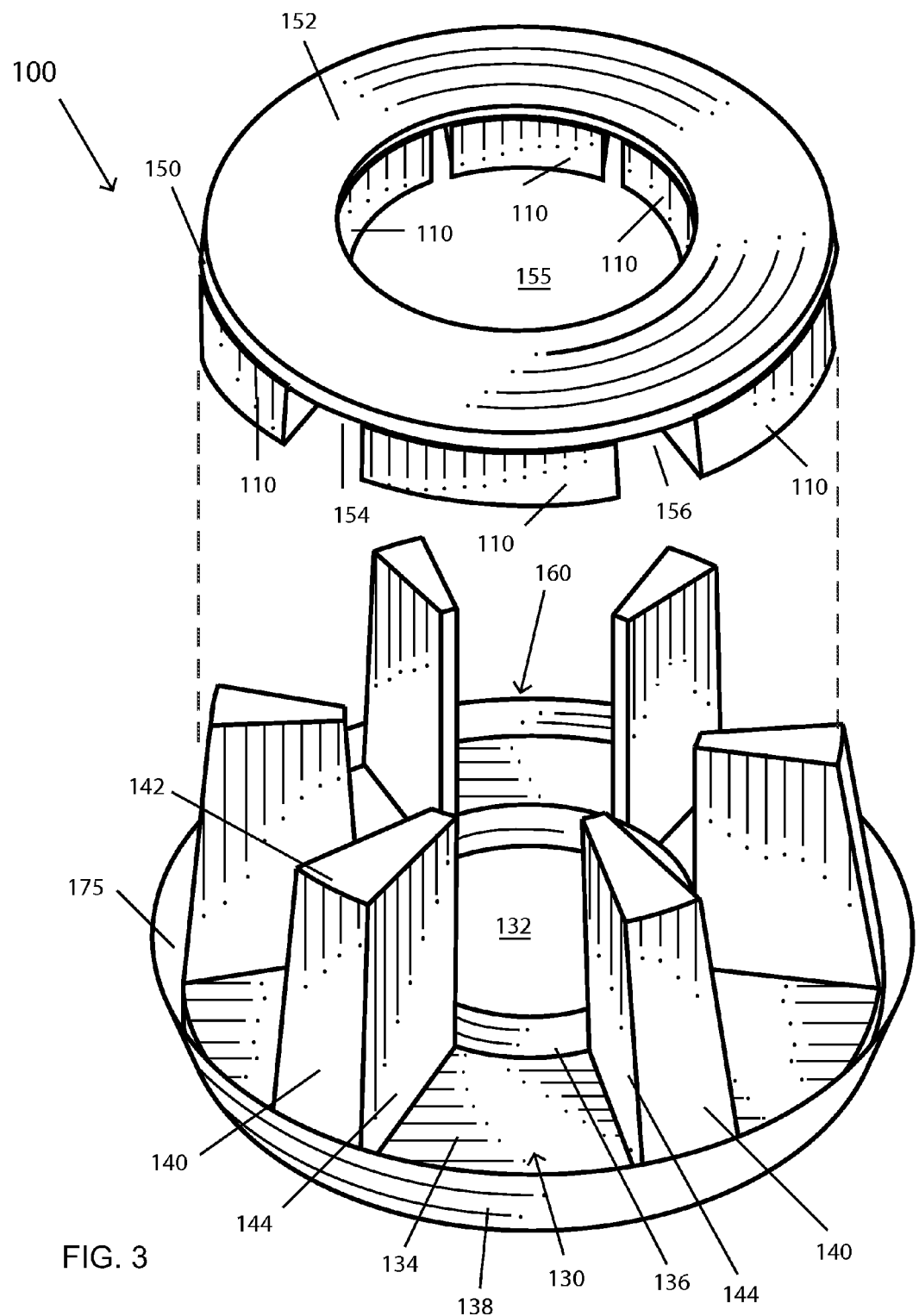
FIG. 3 illustrates an exploded view of an oven console in accordance with an embodiment of the present invention.

FIG. 3 illustrates an example of the oven console 100 in accordance with an embodiment of the present invention. The oven console 100 may include a plurality of heating compartments 130 arranged around the central recess 160. For example, according to embodiments illustrated in FIGS. 1-3, the oven console 100 has six heating compartments 130. It should be understood that the oven console 100 is not limited to six heating compartments 130, but instead may contain any number of heating compartments 130.

Figure 9:
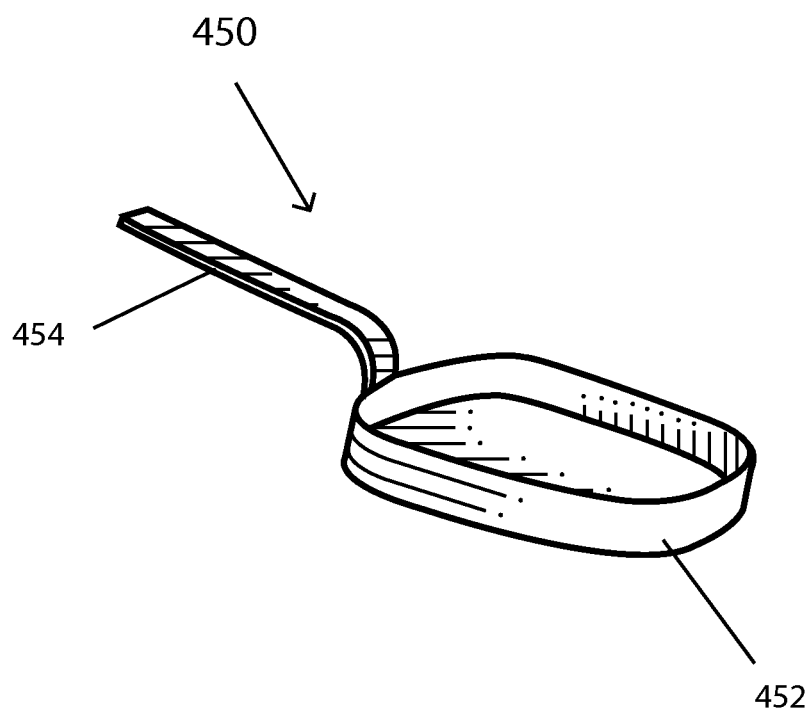
FIG. 9 illustrates a pan for use in a heating system in accordance with an embodiment of the present invention.

Columns 140 may be positioned between each heating compartment 130. An end 142 of each column 140 may be sized and configured to fit within a gap 156 located between each of the heating element 110 to support or otherwise connect to the upper ring 150. The heating compartment 130 may be defined by a chamber or space between sidewalls 144 of two adjacent columns 140, a floor 134, a rear wall 136, and a bottom of a heating element 110. The heating compartment 130 may be dimensioned and shaped so as to receive one or more heating or cooking utensils, such as a tray 452 (FIG. 9) of a pan 450 (FIG. 9).

A rear opening 132 may be located above the rear wall 136 in each heating compartment 130. Accordingly, the rear opening 132 may be open to the central recess 160. In embodiments, where the center pot 400 is placed in the central recess 160, the rear opening 132 may be at least partially covered by a side wall 410 of the center pot 400. In such embodiments, the side wall 410 of the center pot 400 may serve as an additional wall further defining the boundary of each heating compartment 130.

With reference to FIGS. 1B and 3, in various embodiments in which the center pot 400 is heated, the side wall 410 of the center pot 400 may emit heat into the heating compartment 130 to provide an additional heating source in the heating compartment 130. In various embodiments, the heating mechanism 210 may heat an exterior of the center pot 400, such as the side wall 410 of the center pot 400, to 300 degrees or more.

Figure 4:
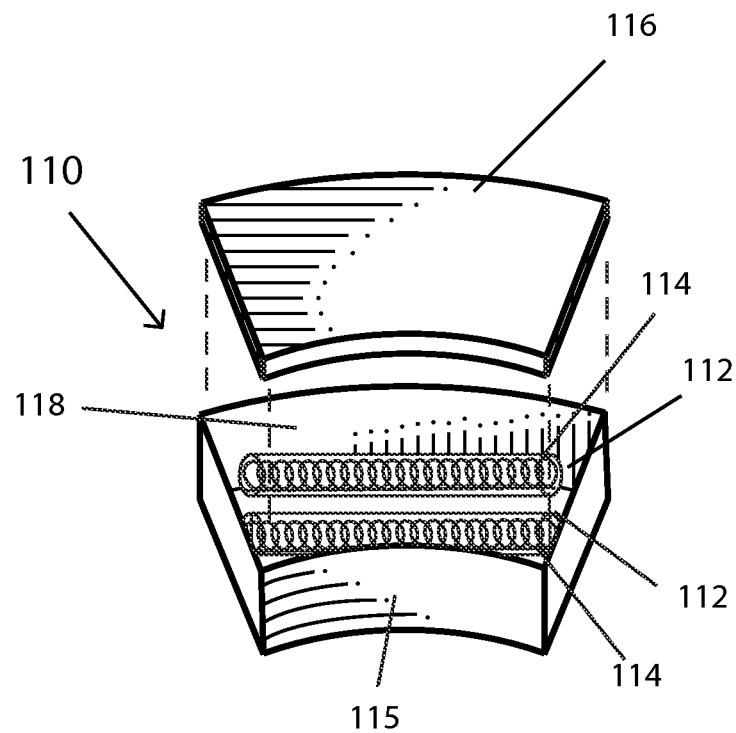
FIG. 4 illustrates an exploded view of an example of a heating element in accordance with an embodiment of the present invention.

FIG. 4 illustrates an exploded view of an example of a heating element 110 according to an embodiment of the present invention. The heating element 110 in the example of FIG. 4 is a radiant heater 110. Other embodiments may use other types of heating elements. The radiant heater 110 in FIG. 4 may comprise a casing 115, one or more heat coils 114, one or more tubes 112, and a shield 116. Each of the one or more heat coils 114 may be disposed within each of the one or more tubes 112. In some embodiments, the heat coils 114 may be infrared light coils. The heat coils 114 may be configured for emitting infrared radiation to generate heat, for example between 400° C. and 1600° C., or more. In some embodiments, the tubes 112 may comprise quartz tubes, or the like. The tubes 112 with the heat coils 114 may be disposed within the casing 115 of the radiant heater 110.

In various embodiments, the inner surfaces of the casing 115 may be reflective surfaces 118, such as metal, or the like. The reflective surfaces 118 may be for reflecting some of the heat emitted by the heat coils 114 toward food items placed in the heating compartment 130.

The shield 116 may be positioned on an end of the casing 115 to cover the casing 115 such that the one or more heat coils 114 and the tubes 112 are positioned between the casing 115 and the shield 116. In some embodiments, the shield 116 may comprise glass, quartz, or the like. The shield 116 may be configured to be suitably transparent to the energy emitted by the heat coils 114. In further embodiments, the shield 116 may be configured to sustain high temperatures, for example between 400° C. and 1600° C., or more. The shield 116 may be for protecting the heat coils 114 and/or tubes 112, for example from splattering of food items placed within the heating compartments 130.

In various embodiments, the radiant heater 110 may be rectangular in shape. In other embodiments, the radiant heater 110 may be trapezoidal in shape. However, in further embodiments the radiant heater 110 may be of any suitable shape.

With reference to FIGS. 3 and 4, the one or more radiant heaters 110 may be arranged on a bottom surface 154 of the upper ring 150. According to FIG. 3, six radiant heaters 110 are arranged on the bottom surface 154 of the upper ring 150. In other embodiments, any number of radiant heaters 110 may be arranged on the bottom surface 154 of the upper ring 150. In various embodiments, the radiant heaters 110 may be connected serially or in parallel. Conductors, such as wires (not shown), connecting to each of the radiant heaters 110 may run along the top surface 152 of the upper ring 150. In some embodiments, the conductors, such as wires (not shown), may run down one or more columns 140 to a power source (not shown) within the oven console 100 and/or heating console 200. For example, one or more columns 140 may have a hollow interior channel through which conductive wires may extend.

In some embodiments, each of the radiant heaters 110 may each be adjusted manually, such that each heating compartment 130 may be controlled to be at a different temperature. In various embodiments, the upper ring 150 may be configured to be removably attachable to the oven console 100 to aid in cleaning the oven console 100, for example in a dishwasher, once the upper ring 150 and the attached electronics, such as the radiant heaters 110, are removed.

In various embodiments, the heating system 10 may allow the user to heat food items in the heating compartment 130 with one or more heating elements 110. In some embodiments, heat, for example infrared heat, emitted from the heating element 110 may heat food items in the heating compartment 130. In further embodiments, heat emitted from the heating mechanism 210 (FIG. 1B) may heat the floor 134 and/or rear wall 136 of the oven console 100, which may provide an additional heat source to heat food items in the heating compartment 130. In yet further embodiments, an example of which is illustrated in FIG. 1B), in which the center pot 400 is heated, for example by the heating mechanism 210, heat emitted from the side wall 410 of the center pot 400 may provide a further source of heat to the heating compartment 130 to heat food items within the heating compartment 130.

With reference to FIGS. 3 and 9 individual pans 450 comprising a tray 452 and a handle 454 may be configured to allow the user to place food items in the tray 452 of the pan 450, and place the tray 452 of the pan 450 within one of the heating compartments 130 by holding the handle 454 of the pan 450. The tray 452 of the pan 450 may be made of metal, or any other suitable heat transferring material. In various embodiments, the tray 452 of the pan 450 may be coated with a low-friction material, such as, but not limited to, polytetrafluoroethylene, and the like, to avoid sticking to food items.

The heating compartment 130 may have a front opening 138 opposite the rear opening 132. The front opening 138 may be configured to allow the user to easily insert the tray 452 of the pan 450 containing food items into the heating compartment 130. The user may continue to hold the handle 454 of the pan 450 while the food items in the tray 452 of the pan 450 are heated within the heating compartment 130. Alternatively, the user may rest or otherwise place the tray 452 of the pan 450 on the floor 134 of the heating compartment 130 and then grab the handle 454 of the pan 450 and remove the tray 452 of the pan 450 and the food items within the tray 452 of the pan 450 after the tray 452 of the pan 450 has been in the heating compartment 130 a suitable period of time.

In some embodiments, an annular member, or ring 175 may be disposed adjacent the base 120 of the oven console 100. The ring 175 may be angled relative to the base 120 of the oven console 100, such that the ring 175 or a portion thereof may be raised relative to the base 120 of the oven console 100. In some embodiments, the ring 175 may be angled at approximately a 45° angle relative to the floor 134 of each heating compartment 130. Accordingly, the ring 175 may be angled at approximately a 45° angle relative to the front opening 138 of the heating compartment 130 as well. The ring 175 may be configured to deflect or otherwise retain some of the heat provided by the heating element 110. The ring 175 may also be configured to deflect or otherwise retain some of the heat in the heating compartment 130, for example heat provided by the center pot 400 through the rear opening 132 and/or the heating mechanism 210 transmitted through the floor 134 of each heating compartment 130.

In various embodiments, the ring 175 may also allow the user to slide the tray 452 of the pan 450 through the front opening 138 into the heating compartment 130 and place the tray 452 of the pan 450 down on the floor 134 of the heating compartment 130. In such embodiments, the ring 175 may help retain the tray 452 of the pan 450 within the heating compartment 130, for example, to prevent the tray 452 of the pan 450 from accidentally falling out of the heating compartment 130. After the tray 452 of the pan 450 has been in the heating compartment 130 a suitable period of time, the user may slide or otherwise remove the tray 452 of the pan 450 by lifting the tray 452 of the pan 450 over the ring 175 and out of the heating compartment 130.

In various embodiments, each heating compartment 130 may function as a heating station with one or more users located at each station. As such, according to an embodiment illustrated in FIGS. 1-3, the heating system 10 may be used with six users. In other embodiments, a user may use multiple heating compartments 130 to allow the user to heat a variety of food items at varying temperatures, for example. As such, the heating system 10 can be used to accommodate a lesser number or greater number of users.

Figure 5:
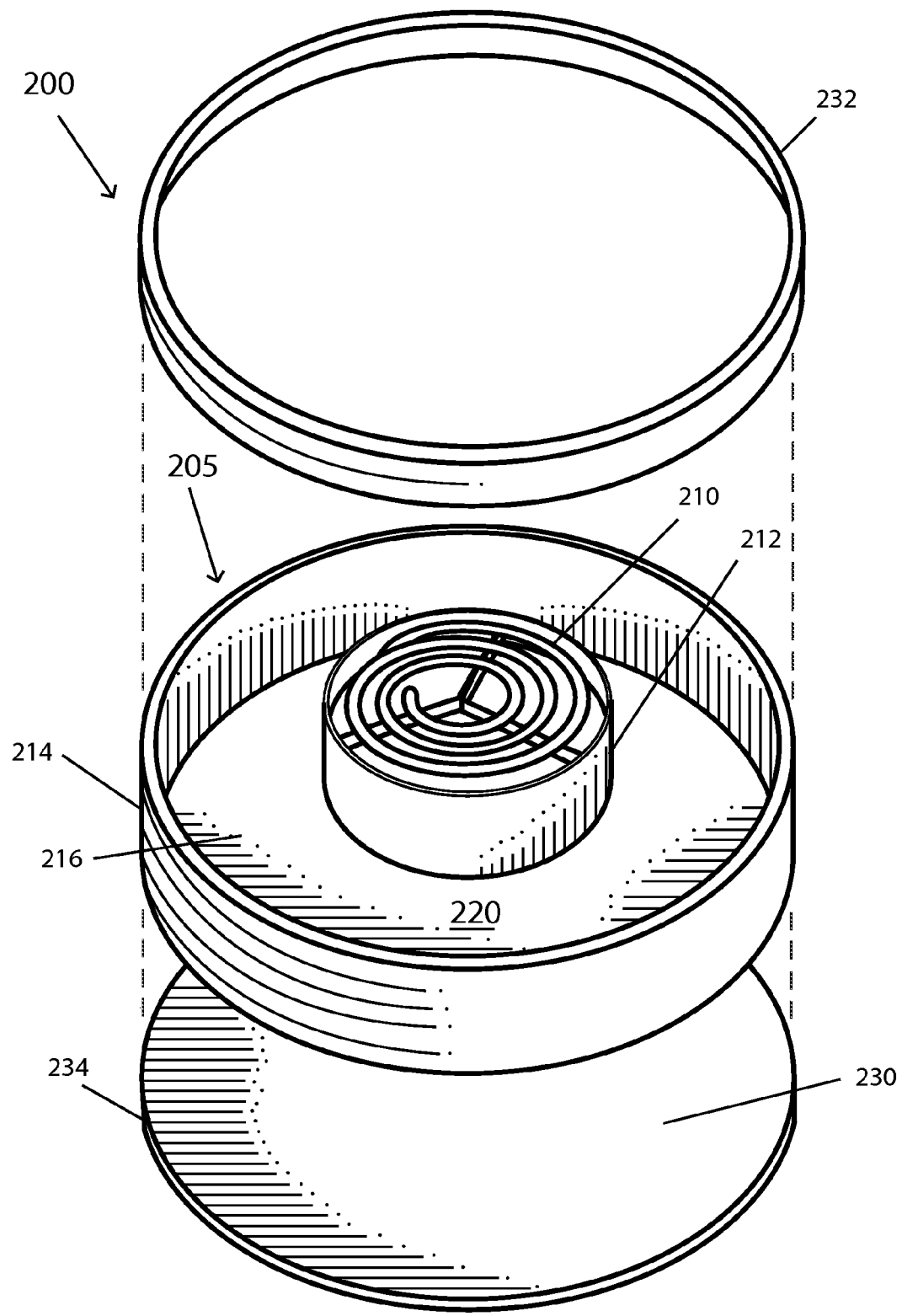
FIG. 5 illustrates an exploded view of a heating console in accordance with an embodiment of the present invention.

FIG. 5 illustrates an exploded view of an example of the heating console 200 in accordance with an embodiment of the present invention. The heating console 200 may comprise the base 205 and the heating mechanism 210. The heating mechanism 210 in the example in FIG. 5 is a coil burner 210. Other embodiments may use another type of heating mechanism in alternative to or in addition to a coil burner, such as a radiant heater, or the like.

With reference to FIGS. 1B and 5, an outer annular wall 214 of the base 205 may be orientated vertically from a horizontally orientated floor 216 of the base 205. The outer annular wall 214 of the base 205 may be connected to the floor 216 of the base 205. An inner annual wall 212 of the base 205 may be orientated vertically from the floor 216 of the base 205. The inner annular wall 212 may be connected to the floor 216 of the base 205. The inner annular wall 212 may be disposed within the outer annular wall 214. In some embodiments, the outer annular wall 214 and/or the inner annular wall 212 may be integral to the floor 216 of the base 205.

In other embodiments, the outer annular wall 214 and/or the inner annular wall 212 may be removably attachable to the floor 216 of the base 205, for example to allow each part to be cleaned separately. For example, the outer annular wall 214 and/or the inner annular wall 212 may include, but is not limited to, one or more tabs (not shown) that are insertable into one or more slots (not shown) on the floor 216 of the base 205. In further embodiments, the outer annular wall 214 and/or the inner annular wall 212 may be connected to the floor 216 of the base 205 in any suitable manner.

The heating mechanism 210 may be positioned on a top surface of the floor 216 of the base 205, for example within the inner annular wall 212, such that the heating mechanism 210 is centrally located within the heating console 200. In some embodiments, the heating mechanism 210 may be integral to the base 205. In other embodiments, the heating mechanism 210 may be removably attachable to the base 205 to allow the heating mechanism 210 to be easily removed so that the base 205 and/or heating mechanism 210 can be removed, for example for cleaning, replacement, etc. For example, the heating mechanism 210 may have a threaded portion that may be screwed into a threaded area of the base 205. In further embodiments, the heating mechanism 210 may be attached to the base 205 is any suitable manner.

Conductors, such as wires (not shown), may connect the heating mechanism 210 to a resistor (not shown), which can be varied by manually turning a knob (not shown). By turning the knob (not shown), the temperature of the heating mechanism 210 can be increased or decreased accordingly. The heating mechanism 210 may be in contact with a bottom surface 418 of the center pot 400 when the center pot 400 is placed in the central recess 160 of the oven console 100. The heating mechanism 210 may be for heating the center pot 400 and any contents within the center pot 400, such as water, oil, and the like when the center pot 400 contacts, or is otherwise supported sufficiently near, the heating mechanism 210.

An annular chamber 220 may be formed between the inner annular wall 212, the outer annular wall 214, and the floor 216. The base 120 of the oven console 100 may be approximately sized and shaped to substantially cover the annular chamber 220. The base 120 may fit within, upon, or otherwise overlap the base 205 of the heating console 200. For example, the base 120 of the oven console 100 may be in the shape of an annular ring that may rest on one or more of the outer annual wall 214 and the inner annual wall 212 to cover the annular chamber 220.

In some embodiments, the outer annular wall 214 may have a height that is larger than a height of the inner annular wall 212. Thus, when the base 120 of the oven console 100 covers the annular chamber 220, there may be a gap 222 provided or otherwise formed between a top surface of the heating mechanism 210 and the base 120 of the oven console 100.

In such embodiments, the gap 222 may allow the heating mechanism 210 to radiate or otherwise provide heat to the annular chamber 220 and/or a bottom surface of the base 120 of the oven console 100. As a result, heat radiated by the heating mechanism 210 into the annular chamber 220 may heat the base 120 of the oven console 100 and accordingly heat the floor 134 of each heating compartment 130 to provide heat in the heating compartment 130, for example to food items in the tray 452 of the pan 450 (FIG. 9).

Figure 6:
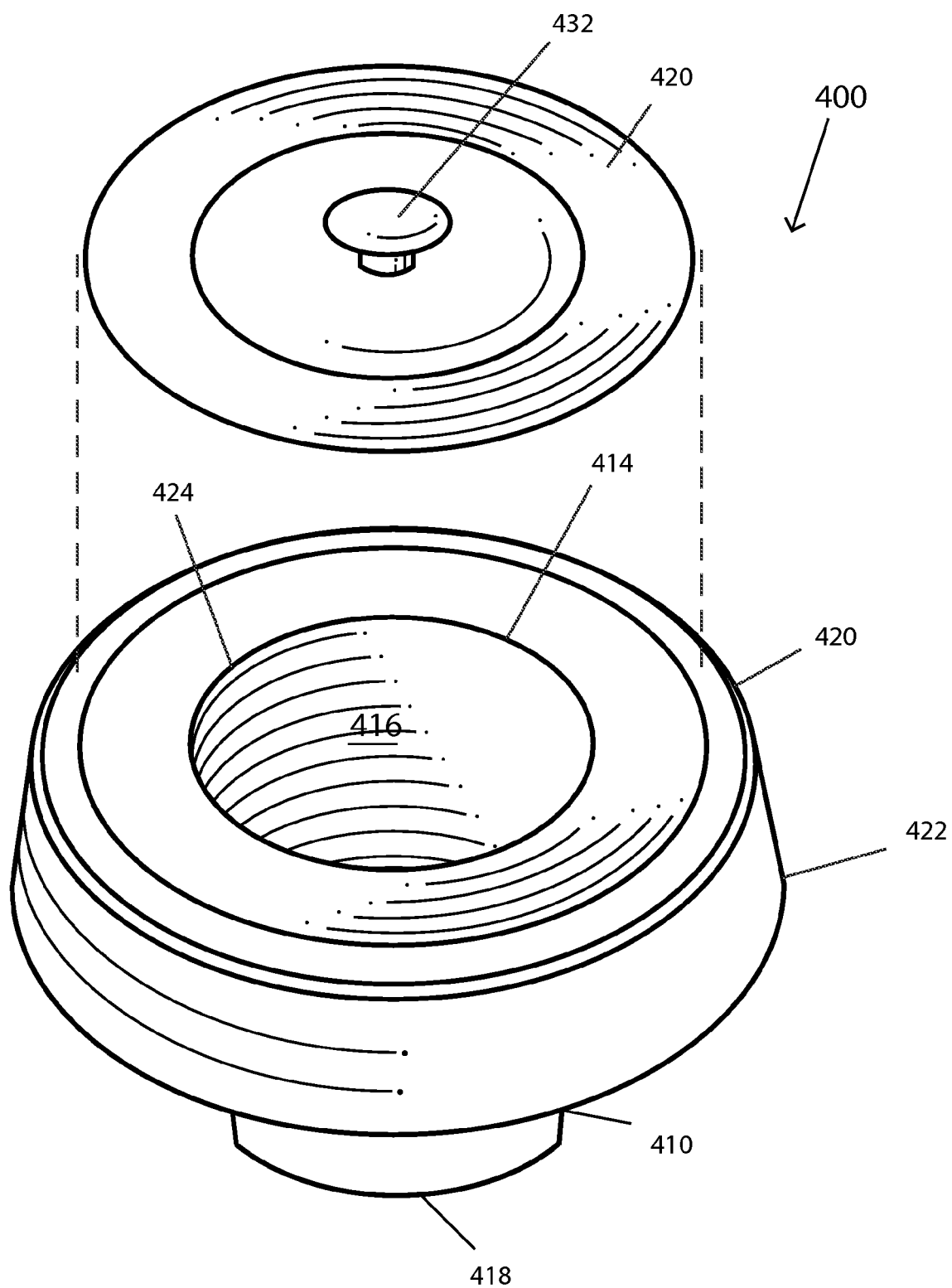
FIG. 6 illustrates an exploded view of a center pot for use in a heating system in accordance with an embodiment of the present invention.

FIG. 6 illustrates the center pot 400 according to an embodiment of the present invention. With reference to FIGS. 1B and 6, the center pot 400 may comprise an aluminum pot, or the like. The center pot 400 may be for placing within the central recess 160 of the oven console 100. The center pot 400 may include an annular side wall 410 that defines a pot chamber 416. The center pot 400 may have an opening 414 that opens to the pot chamber 416. In some embodiments, the center pot 400 may include a lip (not shown) encircling the opening 414 and extending away from a latitudinal centerline of the center pot 400. In such embodiments, the lip (not shown) may rest on the upper ring 150 and support the center pot 400 within the central recess 160 of the oven console 100.

In various embodiments in which the center pot 400 is placed within the central recess 160 of the oven console 100, a bottom surface 418 of the center pot 400 may be in contact with the heating mechanism 210, such that the center pot 400 sits on the heating mechanism 210. This may allow the heating mechanism 210 to heat the center pot 400 and the contents within the pot chamber 416 of the center pot 400.

In various embodiments, the pot chamber 416 may be configured to contain water or a broth mixture (not shown) to be heated to a boiling temperature or higher to heat food items in the broth, such as raw fish, meat, noodles, pasta, vegetables, and a variety of other food items in a short period of time. In various embodiments, the heating mechanism 210 may be configured to heat the broth mixture to at least 150 degrees. In some embodiments, the center pot 400 may be configured to be utilized as a fondue pot. Accordingly, the pot chamber 416 of the fondue pot 400 may be configured to contain a variety of liquids, such as oils, chocolates, cheeses, etc.

In some embodiments, the center pot 400 may include a ring cover 420. The ring cover 420 may configured to be placed over the upper ring 150. The ring cover 420 may be provided for protecting the upper ring 150 and any electronics arranged on or adjacent the upper ring 150, such as the heating elements 110 and associated wire connections (not shown). For example, the ring cover 420 may protect against some of the liquid in the pot chamber 416 of the center pot 400 from splattering on the electronics.

In various embodiments, the ring cover 420 may include an annular side wall 422 extending away from the ring cover 420 toward the oven console 100. The annular side wall 422 of the ring cover 420 may be for further protecting the upper ring 150 and any electronics arranged on or adjacent the upper ring 150, such as the heating elements 110 and associated wire connections. In some embodiments, the annular side wall 422 of the ring cover 420 may extend at least partially over the front opening 138 of the heating compartment 130. In such embodiments, the annular side wall 422 may aid in retaining heat within the heating compartment 130.

In various embodiments, the lip (not shown) of the center pot 400 may be placed on the ring cover 420 to support the center pot 400 within the central recess 160 of the oven console 100. In other embodiments, the lip (not shown) of the center pot 400 may be placed on the top surface 152 of the upper ring 150, and the ring cover 420 may be placed over the upper ring 150 and the lip 412 of the center pot 400.

In various embodiments, the ring cover 420 and the center pot 400 may be a single unitary piece. In such embodiments, the ring cover 420 may rest on the upper ring 150 and support the center pot 400 within the central recess 160 of the oven console 100. In addition, the ring cover 420 may protect the top surface 152 of the ring cover 150 and any electronics therein.

In some embodiments, a pot cover 430 may be placed over the center pot 400 to cover the contents within the pot chamber 416 of the center pot 400. The pot cover 430 may be configured to cover the opening 414 of the center pot 400. In other embodiments, the pot cover 430 may be configured to partially or completely cover the ring cover 420 as well. The pot cover 430 may include a handle 432 for removing the pot cover 430 from the center pot 400.

Figure 7:
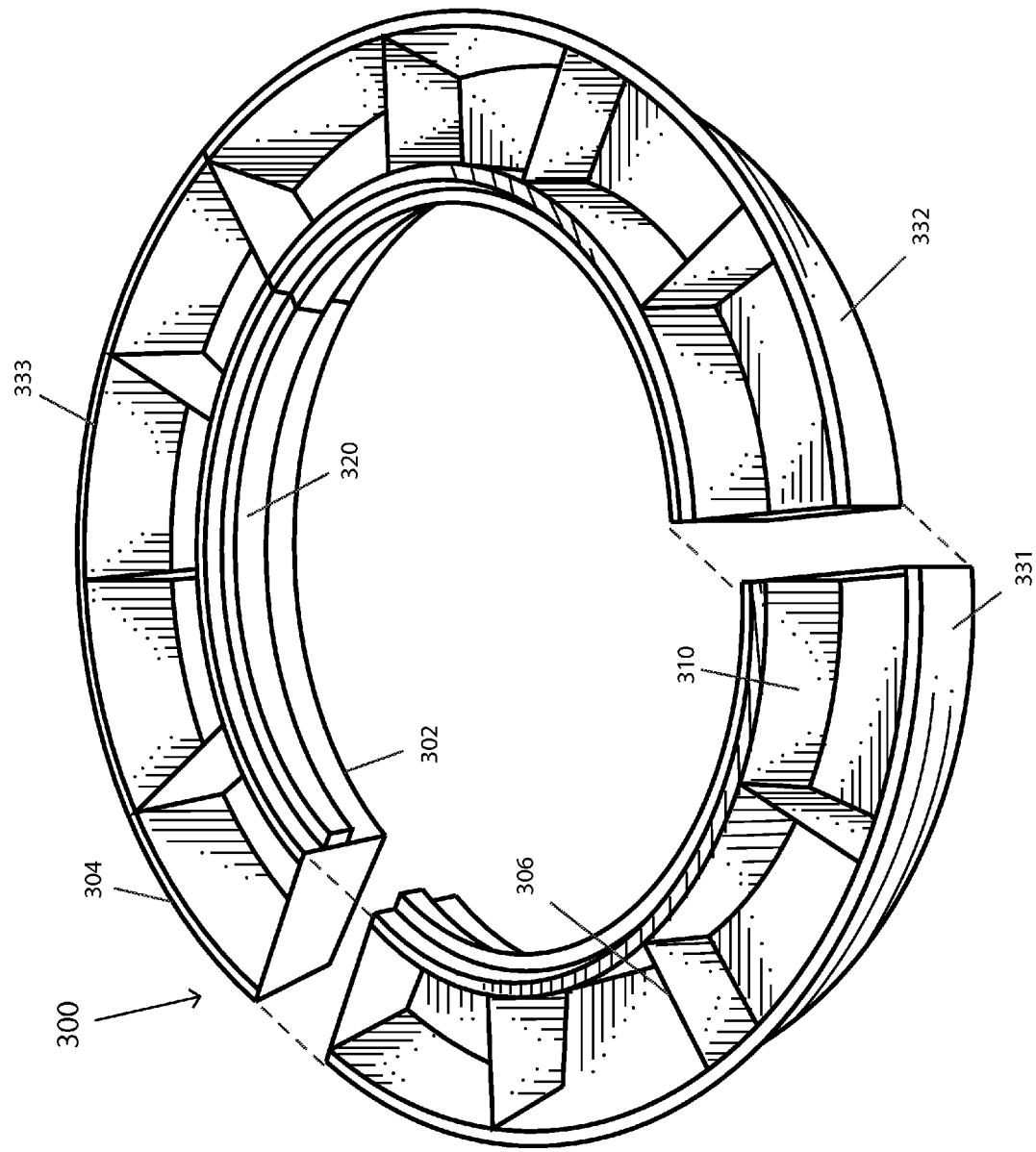
FIG. 7 illustrates an exploded view of a tray in accordance with an embodiment of the present invention.

FIG. 7 illustrates the tray 300 according to an embodiment of the present invention. With reference to FIGS. 1B and 7, the tray 300 may be positioned adjacent the heating console 200. In some embodiments, the tray 300 may be an annular member positioned around the heating console 200. The tray 300 may have one or more food compartments 310. In some embodiments, the tray 300 may be mounted and supported relative to the heating console 200 for rotation around the heating console. In such embodiments, the tray 300 may be rotatable in a manner similar to a lazy susan configuration.

Each of the food compartments 310 may be for holding a certain food, sauce, condiments, or the like. A divider 306 may be positioned between each food compartment 310 to separate each food, sauce, etc. In some embodiments, the divider 306 may be configured to be removable to increase the size of the food compartment 310.

Figure 8:
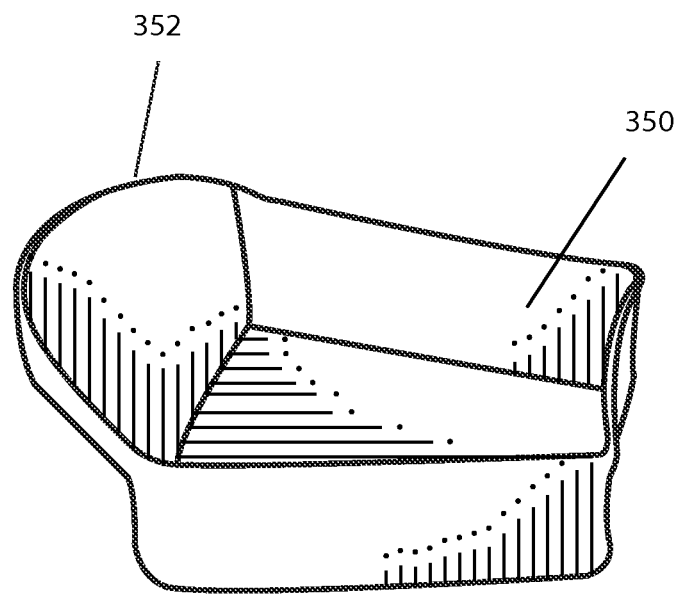
FIG. 8 illustrates a container for use in a heating system in accordance with an embodiment of the present invention.

FIG. 8 illustrates a container 350 for use in the heating system 10 in accordance with an embodiment of the present invention. With reference to FIGS. 7 and 8, in various embodiments, the containers 350 may be placed within the food compartments 310. The containers 350 may be sized and dimensioned to fit into each food compartment 310. The food compartment 310 may be for containing certain foods, sauces, condiments, etc. For example, the user may fill each of the containers 350 with various food items and then arranged around the heating console 200 within the food compartments 310 of the tray 300. Such embodiments allow food items to be placed in each container 350 and kept in the refrigerator until it is ready for use with the heating system 10.

In some embodiments, the containers 350 may each include a tab 352 configured to allow the user to easily grab one of the containers 350 by the tabs 352. For example, the tab 352 may be raised relative to the container 350.

In other embodiments, the containers 350 may be pre-filled or pre-packaged. For example, the containers 350 could be produced and/or packaged according to a food service program by a food packaging company that will pre-prepare these containers 350 with food that is specifically tailored to dietary requirements and portion control as recommended by nutritional food programs. Food items within the pre-packaged containers 350 may be designed to fit within guidelines of a diet program that, for example supports weight loss, controls diabetes and blood pressure, and/or works within a program of allowable portions. These pre-packaged containers of food items may have a slight gourmet style. The pre-packaged containers 350 may be sized and dimensioned to fit specifically into the food compartments 310 of the tray 300 such that the food items contained within the pre-packaged containers 350 may be used with the heating system 10. The pre-packaged containers 350 may be made available in many ways, including, but is not limited to, on-line ordering, grocery stores, catalog order, and/or supplied at locations that monitor personal performance.

In various embodiments, the food compartments 310 may be heated and/or chilled to keep food items within the food compartments 310 warm and/or cool. For example, the food compartments 310 may be heated by heat from the annular chamber 220 provided by the heating mechanism 210.

In some embodiments, each of the food compartments 310 may have a door (not shown) that may cover the respective food compartment 310 when the door is in a closed position. In further embodiments, the containers 350 may include a cover (not shown), a door (not shown), or the like to keep fresh or otherwise protect food items contained within the containers 350.

With reference to FIGS. 1B, 5, and 7, in various embodiments, the tray 300 may be rotatable about the heating console 200. For example, a bearing assembly may be provided between the heating console 200 and the tray 300 such that the tray 300 may be rotatable about the heating console 200. The bearing assembly may include one or more bearings 232, such as ball bearings, or the like, and a complementing ring 320. The one or more bearings 232 or railings may be formed or provided on an exterior side of the outer annular wall 214 of the heating console 200. The complementing ring 320 may be formed or provided on an inner annular wall 302 of the tray 300 for engaging the one or more bearings 232. As a result, the tray 300 may be rotatable about the heating console 200.

In other embodiments, the one or more bearings 232 or railings may be located on the inner annular wall 302 of the lazy susan and the complementing ring 320 may be located on the exterior side of the outer annular wall 214 of the heating console 200.

The base 205 of the heating console 200 may be positioned on a platform 230. The platform 230 may have a diameter that is slightly larger than a diameter of the base 205 of the heating console 200, such that a lip 234 of the platform 230 may encircle the base 205 of the heating console 200. In some embodiments, the lip 234, for example, may include one or more bearings (not shown) that engage with a complementing ring (not shown) located on the lazy susan, such that the tray 300 may be rotatable about the heating console 200 at the lip 234.

In other embodiments, the one or more bearings (not shown) or railings may be located on the inner annular wall 302 of the tray 300. The bearings may be configured to engage with a complementing ring (not shown) located on the lip 234, such that the tray 300 may be rotatable about the heating console 200 at the lip 234.

With reference to FIG. 7, in some embodiments, the tray 300 may comprise a plurality of connectable sections, such as a first section 331, a second section 332, and a third section 333 that when connected may form an annular-shaped tray 300 that may be installed around the heating console 200 (FIGS. 1A and 1B). For example, one end of each section may have one or more tabs (not shown) that may be insertable into one or more slots (not shown) on the opposite end of each section. In such embodiments, a plurality of connectable sections may allow the tray 300 to be broken down into smaller, more manageable units that are easier to stow and/or package. When the user is ready to use the heating system 10, the plurality of connectable sections can be connected together to form the tray 300 and installed around the heating console 200 (FIGS. 1A and 1B). After the heating system 10 has been used, the tray 300 may be broken down into the first section 331, the second section 332, and the third section 333 so that the tray 300 and the rest of the heating system 10 can be stowed away.

With reference to FIG. 5, in various embodiments, the floor 216 of the base 205 may be made of an insulated material that conducts heat poorly, such as wood, plastic, or the like. Such an embodiment may prevent the heating mechanism 210 and/or the heating system 10 from conducting heat to a suitable surface, such as a table top or countertop, or the like, on which the heating system 10 is placed. This may prevent the heating system 10 from burning, melting, scorching, or otherwise damaging the suitable surface. In various embodiments, the outer annular wall 214 of the base 205 may be made of an insulated material, such as wood, plastic, or the like, that conducts heat poorly. Such an embodiment may prevent the heating mechanism 210 and/or the heating system 10 from conducting heat to the tray 300 (FIG. 7) and the food contents therein.

In some embodiments, one or more foot pads (not shown) may be affixed to a bottom surface of the base 205 of the heating console 200. The footpads (not shown) may form one or more resting surfaces when the heating system 10 is placed on a suitable surface, such as a tabletop, a countertop, or the like. In some embodiments, the footpads (not shown) may be made of an insulated material that conducts heat poorly such as wood, plastic, or the like. Such an embodiment may prevent the heating mechanism 210 and/or heating system 10 from conducting heat to the suitable surface, which may burn, melt, scorch, or otherwise damage the suitable surface.

With reference to FIGS. 1A and 1B, the heating system 10 may include additional accessory units that accent menus that are more traditional. For example, in some embodiments, the heating system 10 may include a steamer apparatus (not shown) that can be used with the center pot 400. The center pot 400 may be filled with water, which can be boiled to create steam. The steamer apparatus (not shown) may be configured to emit the steam to heat, for example Dim Sum, fish, ravioli, bread, as well as prepare various deserts, and the like.

The heating system 10 may be used in both residential and commercial locations. The heating system 10 may be used with a cookbook demonstrating various recipes and food styles that can be prepared in the heating system 10. For example, the cookbook may be coordinated to explain how each type of food can be prepared within the heating system 10, from meats, fish, cheese, pizza, and so forth.

The cookbook may also offer cooking themes, which are coordinated by country and culture. For example, one can prepare a German theme where the center pot 400 and/or the fondue pot may be filled with a beer-based broth. As such, a user can heat and/or cook everything from schnitzel to Spaetzle within the center pot 400 and/or fondue pot. In addition, the user may also heat and/or cook various versions of sauerbraten, sausages, and other food items within the heating compartments 130. As an additional example, a Chinese theme may include a beef-based broth, or a sukiyaki broth, within the center pot 400 where the user can heat and/or cook everything from Dim Sum items to vegetables, Bok Choy, fishcakes, and the like.

In further embodiments, the heating system 10 may include a second center pot (not shown). The second center pot (not shown) and the center pot 400 may be part of a double broiler. The second center pot (not shown) may be a fondue pot, for example, which may contain cheese, for example. The fondue pot may be placed within the center pot 400. The center pot 400 may be filled with water, which can be boiled to heat the contents of the fondue pot, such as cheese or the like. The center pot 400 may heat the fondue pot and the cheese within with steam to keep the cheese from burning. Similarly, the fondue pot may be used for chocolates, caramels, and the like. In various embodiments, the heating system 10 may include skewers that are used to heat food items in the center pot 400.

Figures 10A, 10B:
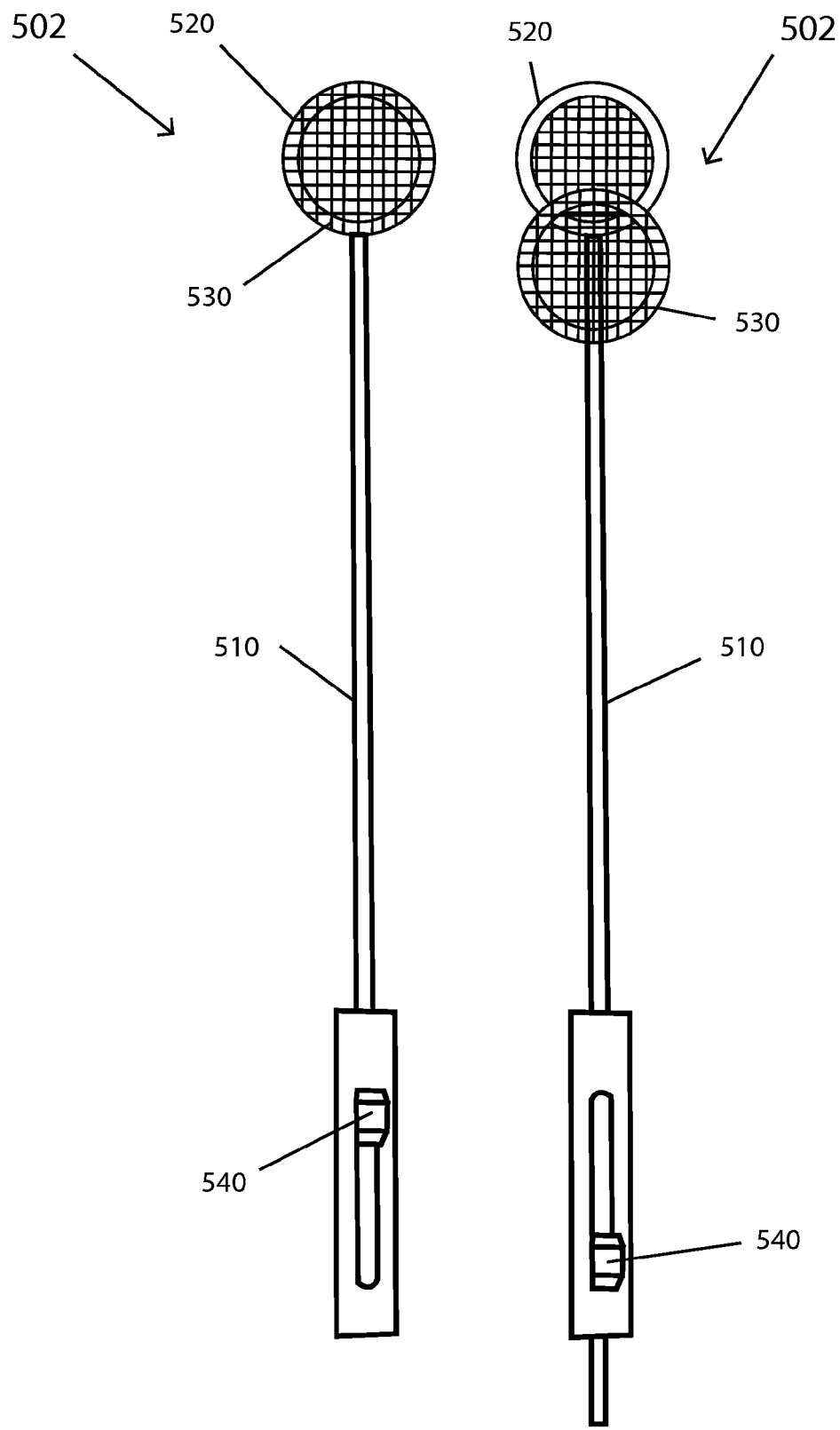
FIG. 10A illustrates a basket utensil for use with a heating system in accordance with an embodiment of the present invention.
FIG. 10B illustrates a basket utensil for use with a heating system in accordance with an embodiment of the present invention.

FIGS. 10A and 10B illustrate a basket utensil 502 for use with the heating system 10 in accordance with an embodiment of the present invention. In some embodiments, the heating system 10 may include the basket utensil 502. The basket utensil 502 may include a shaft 510 and a basket 520 located at the end of the shaft 510. The basket 520 may include a sliding top 530 for allowing the user to put food items in the basket 520, and close the sliding top 530 to keep the food items contained in the basket 520 while the food is heating in the center pot 400 (FIG. 6).

For example, the sliding top 530 may be operatively connected to a switch 540, button, or the like. In such an example, when the switch 540 is pulled, the sliding top 530 may slide to open the basket 520. When the switch 540 is pushed, the sliding top 530 may slide to close the basket 520. In some embodiments, the basket 520 may be self-straining, such that when food items within the basket 520 are done heating in the center pot 400 the food items can be easily dumped on a plate to eat.

Figure 11A:
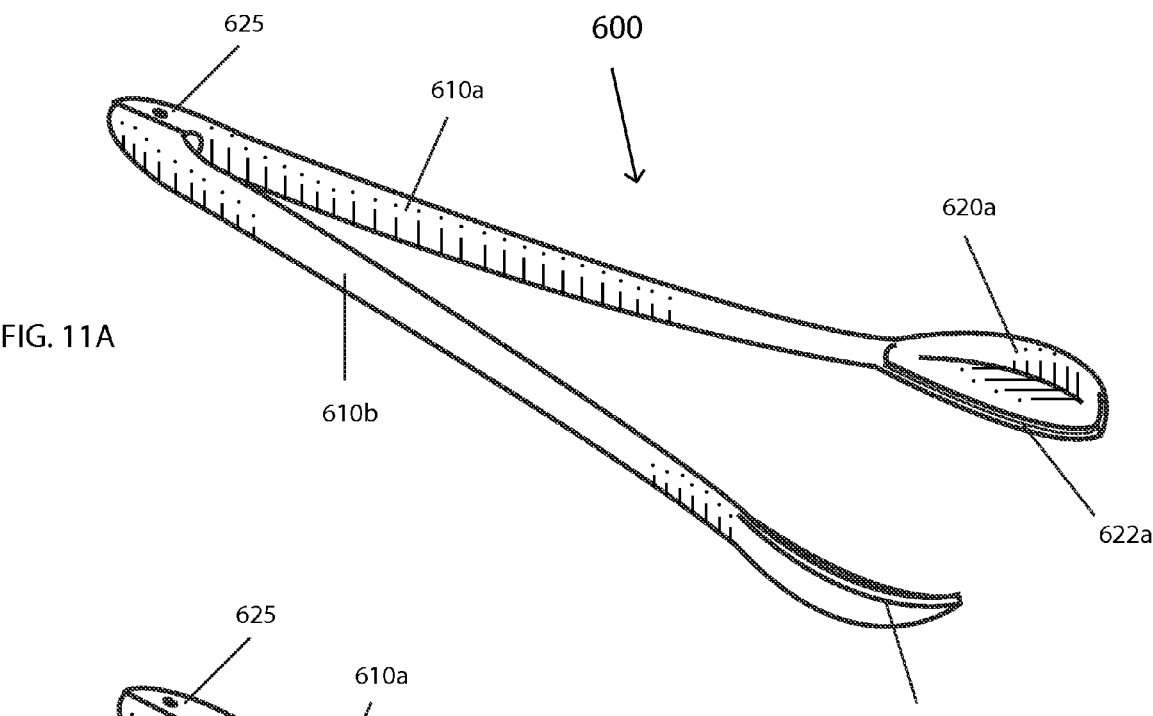
FIG. 11A illustrates a utensil for use with a heating system in accordance with an embodiment of the present invention.
Figure 11B:
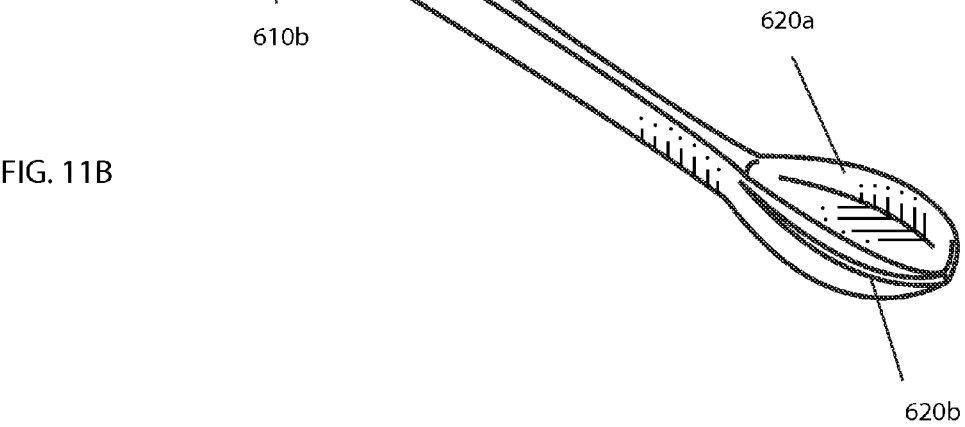
FIG. 11B illustrates a utensil for use with a heating system in accordance with an embodiment of the present invention.

FIGS. 11A and 11B illustrate a utensil 600 for use with the heating system 10 in accordance with an embodiment of the present invention. In some embodiments, the heating system 10 may include the utensil 600. The utensil 600 may have a chopstick or thong configuration. The utensil 600 may include a pair of elongated members or shafts 610*a*, 610*b*. The shafts 610*a*, 610*b* may be connected at an end 625 such that the shafts 610*a*, 610*b* form a single, unitary piece. In other embodiments, the shafts 610*a*, 610*b* may be separate components. In some embodiments, a bias member (not shown), such as a spring or the like, may be provided between the shafts 610a, 610b near the end 625 of the utensil to provide a bias force between the shafts 610a, 610b.

Each of the shafts 610a, 610b may include contoured ends 620a, 620b such that when the shafts 610a, 610b are pressed together the contoured ends 620a, 620b combine or otherwise connect to form a spoon, or otherwise form a bowl-shape. In some embodiments, the contoured ends 620a, 620b may include a seal member, or the like to maintain liquid within the contoured ends 620a, 620b when the shafts 610a, 610b are pressed together. For example, the contoured end 620a may include a ridge 622a configured to mate with a complimenting ridge (not shown) of the other contoured end 620b such that when the shafts 610a, 610b are pressed together the contoured ends 620a, 620b combine to form a spoon.

In some embodiments, the contoured ends 620a, 620b or the utensil 600 entirely may be made of a flexible material, such as silicon, for example a low durometer silicon that may seal the contoured ends 620a, 620b when they are combined. In further embodiments, the ridge 622a may be configured to form a gripping surface, for example to aid a user in grasping food items with the utensil 600 when the shafts 610a, 610b are closed around a food item.

With reference to FIGS. 1A, 1B, and 2, in operation, according to an embodiment of the present invention, the heating system 10 is placed on a suitable surface, such as a tabletop. Electrical power may be provided to the heating system 10 to power the heating mechanism 210 and the radiant heaters 110. The heating mechanism 210 can be turned on to heat the center pot 400 and the contents of the center pot 400. Additionally, each of the heating compartments 130 can be turned on to appropriate heating or cooking temperatures. Individual users may then select food items from the tray 300 and place the food items in the tray 452 (FIG. 9) of the pan 450 (FIG. 9), which can then be inserted into one of the heating compartments 130.

Once placed inside the heating compartment 130, the food items can be heated with heat provided from the heating element 110, heat provided by the heating mechanism 210 emitted through the annular chamber 220 and the floor 134 of the heating compartment 130, and/or heat emitted from the side wall 410 of the center pot 400. In addition, individual users can place food items in a broth mixture, for example, in the center pot 400 to heat more food. After a suitable amount of time, the user can remove the food items from the heating compartment 130 and/or the center pot 400 and eat the food. The user can then repeat this process accordingly.

The embodiments disclosed herein are to be considered in all respects as illustrative, and not restrictive of the invention. The present invention is in no way limited to the embodiments described above. Various modifications and changes may be made to the embodiments without departing from the spirit and scope of the invention. The scope of the invention is indicated by the attached claims, rather than the embodiments. Various modifications and changes that come within the meaning and range of equivalency of the claims are intended to be within the scope of the invention.

What is claimed is:

1. A heating system comprising:
   a tray having one or more compartments for holding food items; and
   a housing supported adjacent the tray, the housing having a plurality of heating compartments configured to receive and contain food items and to provide heat within each of the plurality of heating compartments for heating food items contained within the heating compartments;
   a plurality of separate heating elements, each separate heating element arranged to provide heat toward food items contained in one of the plurality of heating compartments;
   wherein each separate heating element is arranged to provide heat to a different respective one of the plurality of heating compartments relative to each of the other separate heating elements of the plurality of separate heating elements
   wherein the plurality of heating compartments are arranged around the housing, each heating compartment having an opening for receiving one or more food items, each compartment opening facing outward from an outer peripheral side of the housing; and
   wherein the housing has a plurality of walls that are spaced apart from each other, each wall being fixed relative to the outer peripheral side of the housing and extending inward relative to the outer peripheral side of the housing, each wall being arranged between a pair of the heating elements, and wherein each heating compartment comprises a chamber defined by a space between a different pair of the walls, the chamber of each heating compartment configured for containing the one or more food items while the one or more food items are heated.

2. The heating system according to claim 1,
   wherein the tray surrounds the housing and includes a plurality of separated tray sections, each tray section for receiving and holding one or more food items.

3. The heating system according to claim 1,
   wherein the tray is supported for rotation about the housing.

4. The heating system according to claim 1, the tray comprising:
   a plurality of tray sections configured to be selectively connectable to each other and disconnectable from each other, and wherein each tray section is configured for receiving and holding one or more food items.

5. The heating system according to claim 1,
   wherein the plurality of heating compartments comprises at least three heating compartments.

6. The heating system according to claim 1, further comprising: a bowl-shaped vessel configured to be disposed within the housing without blocking the openings for receiving food items of the heating compartments.

7. The heating system according to claim 6,
   wherein the bowl-shaped vessel is configured to be disposed adjacent to each of the plurality of heating compartments when disposed within the housing.

8. The heating system according to claim 6, the system further comprising:
   a first heating mechanism adjacent the bowl-shaped vessel, the first heating mechanism configured to provide heat to the bowl-shaped vessel.

9. The heating system according to claim 8,
   wherein the housing has a recess for receiving the bowl-shaped vessel; and
   wherein the rear side of each of the plurality of heating compartments is located on a linearly opposite side of the heating compartment relative to the opening of the heating compartment, the rear side of each heating compartment being arranged adjacent the recess of the housing.

10. The heating system according to claim 9,
    wherein the rear side of each heating compartment has an opening and wherein the bowl-shaped vessel is configured to at least partially block the opening at the rear side of each of the plurality of heating compartments when the bowl-shaped vessel is in the recess of the housing.

11. The heating system according to claim 9, wherein the bowl-shaped vessel is selectively received within and removable from the recess of the housing and is configured to provide heat to each of the plurality of heating compartments through the rear side of each of the plurality of heating compartments when the bowl-shaped vessel is received in the recess of the housing and the bowl-shaped vessel is heated by the heating mechanism.

12. The heating system according to claim 8, wherein the heating mechanism comprises a coil burner.

13. The heating system according to claim 1, wherein the plurality of heating elements comprise a plurality of radiant heaters; and wherein each radiant heater comprises at least one radiant heat coil disposed within a tube.

14. The heating system according to claim 1, the system further comprising:
a shaft having a longitudinal dimension;
a bowl-shaped container supported by the shaft; and
a covering operatively connected to the shaft for sliding motion relative to the shaft, the covering configured to be moveable by sliding the covering in the longitudinal dimension of the shaft, along the bowl-shaped container to open and close the bowl-shaped container.

15. The heating system according to claim 1, the system further comprising:
a pair of elongated members, the pair of elongated members operatively connected at an end of each respective elongated member;
each elongated member having a contoured end opposite from the end connected to the other elongated member, the contoured ends having partial spoon shapes and configured to connect with each other to form a single spoon-shaped vessel when the contoured ends of the pair of elongated members are brought together.

16. A heating system comprising:
a housing having a plurality of partially enclosed heating compartments configured to provide heat within each of the plurality of heating compartments, each heating compartment being partially enclosed by a cover while also having an open end for receiving items to be heated;
a plurality of separate heating elements for heating of the plurality of heating compartments, where the plurality of separate heating elements includes a first heating element arranged for heating items received through the open end of a first one of the heating compartments of the plurality of heating compartments, and a second heating element arranged for heating items received through the open end of a second one of the heating compartments of the plurality of heating compartments, and where each separate heating element comprises a radiant heater arranged to emit heat toward items received in one of the plurality of heating compartments, each radiant heater comprising at least one radiant heat coil arranged to radiate heat into a respective one of the plurality of heating compartments;
the open ends of the heating compartments are arranged around a circumference of the housing and face outward from the circumference of the housing;
wherein the housing has a plurality of walls that are spaced apart from each other, each wall extending inward relative to the circumference of the housing, each wall being arranged between a pair of the heating elements, and wherein each heating compartment comprises a chamber defined by a space between a different pair of the walls, the chamber of each heating compartment configured for containing the items while the items are heated.

17. The heating system according to claim 16, wherein each heating element is arranged over a different respective one of the plurality of heating compartments.

18. The heating system according to claim 1, wherein the plurality of heating elements comprise a plurality of radiant heaters, each radiant heater comprising a heat coil within a tube arranged over a respective heating compartment.

19. The heating system according to claim 1, wherein the chamber of each heating compartment is between two adjacent walls of the plurality of walls.

20. The heating system according to claim 16, wherein the plurality of heating compartments comprises six heating compartments.

21. The heating system according to claim 1, each heating element arranged between a pair of the walls.

22. The heating system according to claim 16, wherein the plurality of heating compartments are arranged around an outer peripheral side of the housing, with the opening of each heating compartment facing outward from the outer peripheral side of the housing; and
wherein the housing has a plurality of walls that are spaced apart from each other, each wall extending inward relative to the outer peripheral side of the housing.

23. The heating system according to claim 22, wherein each heating compartment is bordered by a pair of the walls.

24. The heating system according to claim 16, wherein each heating element is configured to produce heat independent of heat produced by each other heating element of the plurality of heating elements.

25. The heating system according to claim 1, where each separate heating element comprises a radiant heater.

26. The heating system according to claim 16, wherein each radiant heater comprises a radiant heat coil disposed with a tube.

27. The heating system according to claim 26, wherein each radiant heat coil is configured to radiate infrared radiation through the tube in which the radiant heat coil is disposed.

28. The heating system according to claim 16, wherein each heating element comprises two radiant heat coils, each arranged in a respective tube.

29. The heating system according to claim 16, wherein each heating element comprises at least one quartz tube containing a heat coil configured to produce infrared radiation sufficient to heat its corresponding respective a respective one of the plurality of heating compartments.

30. The heating system according to claim 16, wherein:
the housing has a plurality of walls that are spaced apart from each other, each wall being fixed relative to the circumference of the housing and extending inward relative to the circumference of the housing, wherein each heating compartment comprises a chamber defined by a space between a different pair of the walls, the chamber of each heating compartment configured for containing the one or more food items while the one or more food items are heated.

* * * * *